United States Patent [19]

Nagaishi et al.

[11] 4,185,604
[45] Jan. 29, 1980

[54] FEEDBACK CONTROL SYSTEM FOR GAS FLOW IN INTERNAL COMBUSTION ENGINE FOR PURPOSE OF EXHAUST GAS PURIFICATION

[75] Inventors: Hatsuo Nagaishi; Suzuo Suzuki, both of Yokosuka; Yuji Matsubara, Yokohama, all of Japan

[73] Assignee: Nissan Motor Company, Limited, Yokohama, Japan

[21] Appl. No.: 886,819

[22] Filed: Mar. 15, 1978

[30] Foreign Application Priority Data

Apr. 12, 1977 [JP] Japan ............................ 52/40901
Apr. 12, 1977 [JP] Japan ............................ 52/40902

[51] Int. Cl.² .................... F02M 25/06; F01N 3/10
[52] U.S. Cl. .................... 123/119 A; 60/307
[58] Field of Search ............ 123/119 A; 60/307

[56] References Cited

U.S. PATENT DOCUMENTS

| | | | |
|---|---|---|---|
| 3,712,065 | 1/1973 | Hurst | 60/307 |
| 3,779,222 | 12/1973 | Lorenz | 123/119 A |
| 3,863,615 | 2/1975 | Pagdin | 123/119 A |
| 3,885,540 | 5/1975 | Stadler | 123/119 A |
| 3,948,236 | 4/1976 | Nartowski et al. | 60/307 |
| 4,060,065 | 11/1977 | Hata et al. | 123/119 A |
| 4,071,003 | 1/1978 | Aono | 123/119 A |
| 4,085,586 | 4/1978 | Shibata | 60/307 |
| 4,130,098 | 12/1978 | Linder et al. | 123/119 A |
| 4,147,143 | 4/1979 | Harada | 123/119 A |

*Primary Examiner*—Wendell E. Burns
*Attorney, Agent, or Firm*—Schwartz, Jeffery, Schwaab, Mack, Blumenthal & Koch

[57] ABSTRACT

A feedback control system for controlling the flow rate of a gas which is either drawn from or introduced into an exhaust passage of an internal combustion engine for the purpose of lessening pollutants in the exhaust gas. The control system is embodied either as an exhaust gas recirculation control system or a secondary air injection control system and in either case comprises an electrically operated flow control valve, a control circuit to provide a control signal to the control valve based on input signals representing the engine operating condition so as to establish an optimum flow rate, and an electrostatic type flow rate detector which has the ability of forming ions in the gas to provide a feedback signal on an electrical principle.

24 Claims, 12 Drawing Figures

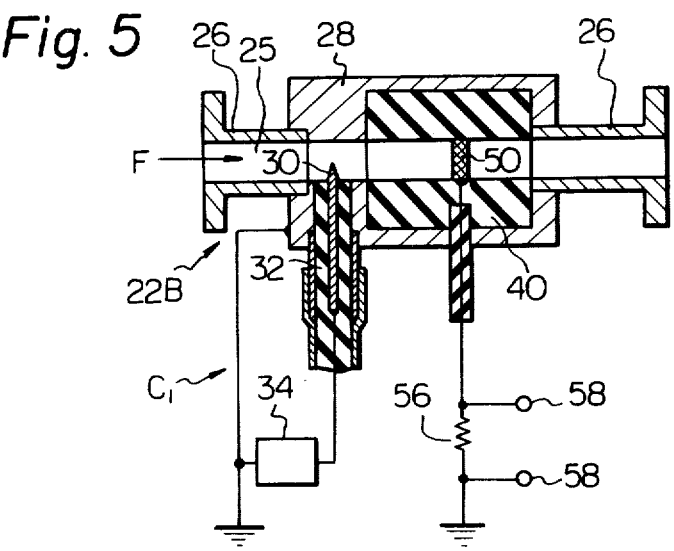
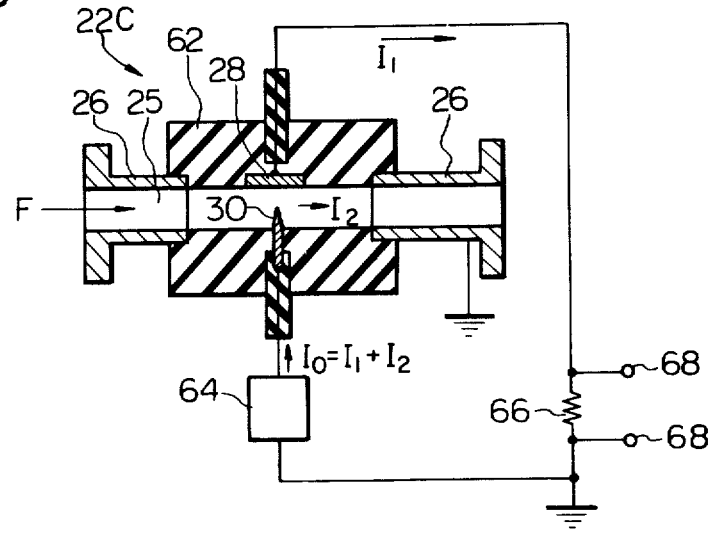

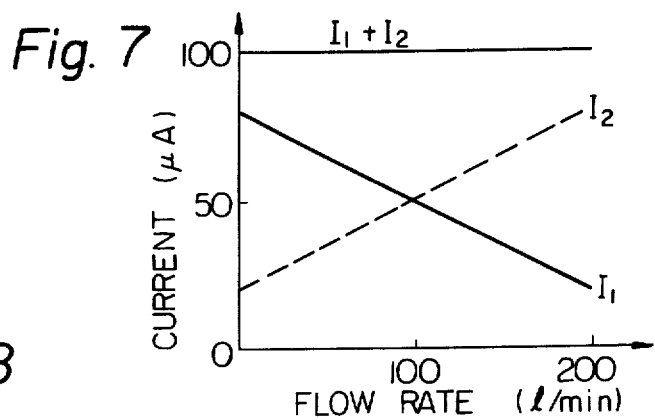
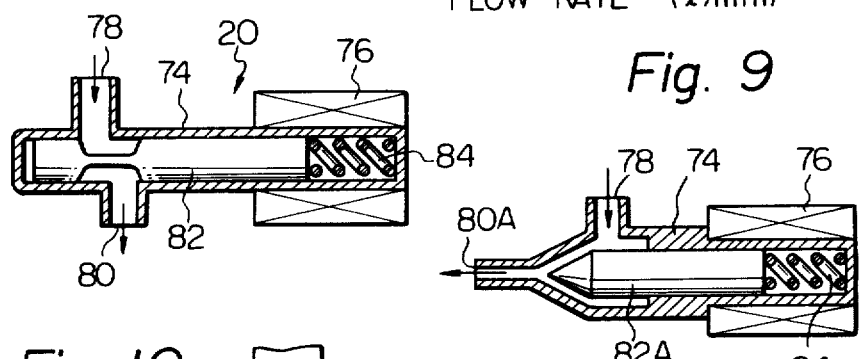
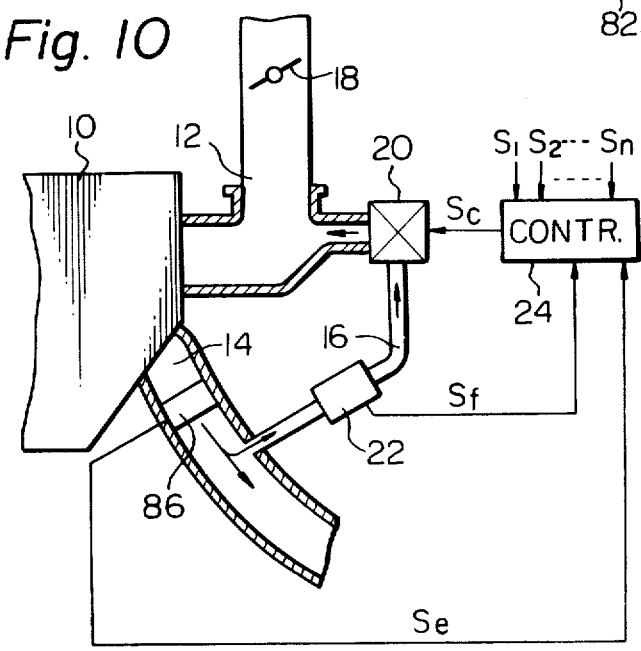

FEEDBACK CONTROL SYSTEM FOR GAS FLOW IN INTERNAL COMBUSTION ENGINE FOR PURPOSE OF EXHAUST GAS PURIFICATION

BACKGROUND OF THE INVENTION

This invention relates to a feedback control system for the control of the rate of a flow of a gas which is either drawn from or introduced into an exhaust passage of an internal combustion engine with the purpose of reducing the concentrations of pollutants in the exhaust gas. A control system of the invention can be embodied both in an exhaust gas recirculation control system and in a secondary air control system.

In internal combustion engines and particularly in automotive engines, it is one of prevailing methods for lessening nitrogen oxides (NOx) in the exhaust gas to recirculate a portion of the exhaust gas from an exhaust passage back into the combustion chambers so as to lower the maximum combustion temperature thereby to suppress the formation of NOx in the combustion chambers. The exhaust gas recirculation (EGR) is carried out by the use of a flow control valve for controlling the quantity of the recirculated exhaust gas relative to the quantity of fresh air or air-fuel mixture admitted into the combustion chambers in dependence on the operating condition of the engine.

For lessening unburned hydrocarbons (HC) and carbon monoxide (CO) in the exhaust gas, a widely employed technique is the injection of secondary air into the exhaust line of the engine to oxidize HC and CO before emission into the atmosphere. In many cases this technique is practised with the provision of either a thermal reactor or a catalytic converter in the exhaust line. The air injection is carried out by the use of a flow control valve designed so as to regulate the quantity of the secondary air in dependence on the engine operating condition.

Either in conventional EGR systems or in conventional secondary air injection (SAI) systems, it is usual to accomplish an open loop control by taking an intake vacuum at or downstream of a main throttle valve as a primary indication of the engine operating condition and using a vacuum-operated flow control valve, though the type of the control valve is different between an EGR system and a SAI system. Closed loop or feedback control is seldom employed in EGR and SAI systems principally because of difficulty in measuring simply and accurately the flow rate of either actually recirculated exhaust gas or actually introduced secondary air.

In a typical prior art EGR system, a flow control valve comprises a diaphragm which supports a valve member and, as an element of a valve actuator, serves as a wall of a vacuum chamber connected to an induction passage at a section where is located a main throttle valve, and the magnitude of vaccum applied to the valve actuator is corrected according to certain factors of engine operating condition such as the cooling water temperature (by the use of a temperature-sensitive stop valve) and the exhaust pressure (by the use of an air admission valve of a diaphragm type). Since no feedback is made and the control is accomplished wholly mechanically, it is impossible in this EGR system to continuously vary the quantity of the recirculated exhaust gas relative to the fresh air in response to changes in the engine operating condition and it is difficult to enlarge the degree of freedom of the control as desired without rendering the system unsuitable for practical use for automotive engines by reasons of complexity in mechanism, rise of cost and lowering of reliability. Besides, the quantity of the recirculated exhaust gas itself exhibits some deviation from an intended value because of limitations to the precision of the control valve and other components. It has been difficult, therefore, to maintain an optimum proportion of the recirculated exhaust gas to the fresh air over a wide range of the engine operating condition, inevitably resulting in that the effectuation of EGR adversely influences the fuel economy, driveability and output characteristic of the engine.

A typical prior art SAI system comprises an air pump driven by the engine for passing secondary air admitted through an air inlet, which is independent of a main induction passage, to an exhaust passage through a secondary air duct which is equipped with a check valve downstream of the air pump and branches at a section between the pump and the check valve to a vacuum-operated control relief valve. A vacuum transmission passage connects the control relief valve to the induction passage at a section, for example, downstream of the main throttle valve so that a variable amount of air supplied from the air pump is discharged into the atmosphere through the control relief valve in dependence on the magnitude of intake vacuum, whereby the quantity of secondary air introduced into the exhaust passage is controlled. In this system too, the control is accomplished wholly mechanically, meaning a relatively small degree of freedom of the control, without making any feedback. It is very difficult, therefore, to realize the introduction of an optimum quantity of secondary air in accordance with changing operating condition of the engine. For example, the extent of the control is such that the air supplied from the air pump is entirely injected into the exhaust passage during medium speed medium load operation of the engine but is partially discharged through the control relief valve while the engine is operated under different conditions at higher speeds, at higher loads or at lower loads. Accordingly the quantity of the secondary air tends to become either so excessive as to render the exhaust gas temperature insufficient for completing the intended oxidation reactions or too small to supply a required quantity of oxygen, resulting in that the lessening of HC and CO is not always achieved to satisfaction and that, as an additional disadvantage, there occurs a considerable increase in fuel consumption.

SUMMARY OF THE INVENTION

It is an object of the present invention to provide a feedback control system for the control of the rate of a flow of a gas which is either drawn from or introduced into an exhaust passage of an internal combustion engine with the purpose of lessening pollutants in the exhaust gas, in which system the control of the gas flow rate according to the engine operating condition is accomplished principally electrically and feedback is made by the use of an electrical sensor means for measuring actual gas flow rate.

It is another object of the invention to provide an exhaust gas recirculation control system for an internal combustion engine, which system operates on an electrical principle and is of a feedback control type.

It is a still another object of the invention to provide a principally electrical feedback control system for the introduction of secondary air into an exhaust passage of an internal combustion engine.

For a gas passage of the described category, a gas flow rate control system of a feedback control type according to the invention comprises: (a) an electrically operated flow rate control valve associated with the gas passage; (b) sensor means each for producing an electrical signal representing a parameter of the operating condition of the engine; (c) a flow rate detection means of an electrostatic type for detecting the rate of flow of the gas through the gas passage and producing a feedback signal representing the detected flow rate; and (d) a control circuit for supplying a control signal to the flow control valve based on the signals produced by the sensor means and the feedback signal.

The flow rate detection means have the function of making corona discharge in a section of the gas passage thereby for forming ions in the gas and detecting the movement of a portion of ions carried by the flow of the gas towards another section of the downstream side. Since the movement of the ions is an indication of the volume rate of flow of the gas, this detection means can provide an electrical signal as the feedback signal without relying on any mechanically moving element.

Usually the control circuit is constructed so as to have the functions of finding an optimum flow rate of the gas through the gas passage under an engine operating condition indicated by the signals produced by the sensor means, detecting any deviation of an actual flow rate represented by the feedback signal from the found optimum flow rate and producing a control signal which causes the flow control valve to function so as to cancel the detected deviation and establish the found optimum flow rate.

When a flow rate control system according to the invention is embodied in an exhaust gas recirculation control system, the aforementioned gas passage means an exhaust gas recirculation passage which interconnects the exhaust passage and induction passage of the engine. If desired, an EGR control system according to the invention may additionally comprise an electrostatic type flow rate detection means of the above described function associated with the exhaust passage in a region upstream of a section where branches the recirculation passage. In this case, an actual proportion of the recirculated exhaust gas to the entire exhaust gas discharged from the engine can directly be found in the control circuit from the signals produced by the two sets of flow rate detector means.

When a flow control system of the invention is embodied in a secondary air injection control system, the aforementioned gas passage means an air feed passage which is connected to the exhaust passage and opens into the atmosphere, usually via an air pump. In this case the flow control valve may be arranged as a relief valve which allows a variable amount of air supplied from the air pump to be discharged from the air feed passage into the atmosphere in response to the control signal thereby to vary the quantity of secondary air introduced into the exhaust passage.

BRIEF DESCRIPTION OF THE DRAWINGS

FIGS. 3–6 respectively show, each in longitudinal section, four variations of an electrostatic flow rate sensor for the detection of a gas flow rate in an EGR control system according to the invention;

FIG. 7 is a graph for the explanation of the function of the flow rate sensor of FIG. 6;

FIGS. 8 and 9 respectively show, each in longitudinal section, two variations of an electromagnetic flow control valve useful in a flow rate control system according to the invention;

FIG. 10 is a diagrammatic presentation of a slight modification of the EGR control system of FIG. 1;

DESCRIPTION OF PREFERRED EMBODIMENTS

The invention will be described in detail first about the case of being embodied in an EGR control system and then about the other case of a secondary air control system.

Figure 1:
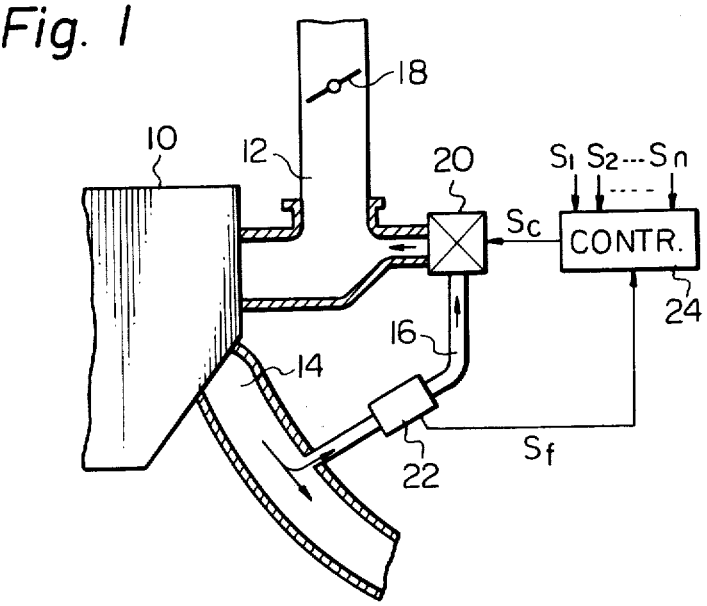
FIG. 1 shows diagrammatically a fundamental construction of an EGR control system according to the invention.

In FIG. 1, an internal combustion engine is indicated at 10 with the provision of an induction passage 12 and an exhaust passage 14 in the usual manner. An exhaust gas recirculation passage 16 in the form of a conduit interconnects the exhaust passage 14 with the induction passage 12 at a section downstream of a main throttle valve 18 for recirculation of a portion of the exhaust gas through the combustion chambers of the engine 10. The recirculation passage 16 is provided with an electrically operated flow control valve 20 and a flow rate sensor 22 of an electrostatic type located upstream of the control valve 20. Alternatively, the flow control valve 20 may be located upstream of the flow rate sensor 22. The particulars of the control valve 20 and the sensor 22 will be described later. The sensor 22 provides an electrical signal $S_f$ representing the flow rate of the recirculated exhaust gas to a control circuit 24 as a feedback signal. The EGR system includes some sensors (omitted from illustration) which detect respectively selected parameters of the engine operating condition such as engine speed, intake vacuum, cooling water temperature, exhaust gas temperature, etc. and provide electrical signals $S_1, S_2, \ldots, S_n$ representing these parameters to the control circuit 24. The control circuit 24 is constructed so as to find an optimum proportion of the volume of the exhaust gas to be recirculated to the volume of fresh air admitted into the engine through the induction passage 12 (this proportion will be referred to as the rate of EGR) under an engine operating condition indicated by the signals $S_1, S_2, \ldots, S_n$. In other words, the control circuit 24 can find an optimum flow rate of the recirculated exhaust gas under the indicated operating condition of the engine 10. For example, the control circuit 24 may comprise computer circuits for memory of optimum rates of EGR (or flow rates of exhaust gas through the recirculation passage 16) under a variety of engine operating conditions and for readout of one of the stored rates corresponding to the actual operating condition indicated by the input signals $S_1, S_2, \ldots, S_n$. Furthermore, the control circuit 24 has the function of comparing an actual flow rate of the recirculated exhaust gas represented by the feedback signal $S_f$ with the optimum flow rate found in the control circuit 24 to detect a deviation, if any, of the actual flow rate from the optimum flow rate. Through these functions the control circuit 24 produces a control signal $S_c$, which controls the operation of the flow control valve 20 so as to cancel the detected deviation. When the feedback signal $S_f$ implies a flow rate larger than optimum flow rate indicated by the control signal $S_c$, the control circuit 24 varies its output $S_c$ so as to decrease the degree of opening of the flow control valve 20 until the actual flow rate indicated by the feedback signal $S_f$ comes to agreement with the optimum flow rate. When the actual flow rate is amller than the optimum flow rate, the control circuit 24 functions so as to increase the degree of opening of the control valve 20. In this sense, the control circuit 24 does not fundamentally differ from hitherto developed electronic air/fuel ratio controllers for use in automotive internal combustion engines with the employment of oxygen concentration in the exhaust gas as a feedback signal.

Figure 2:
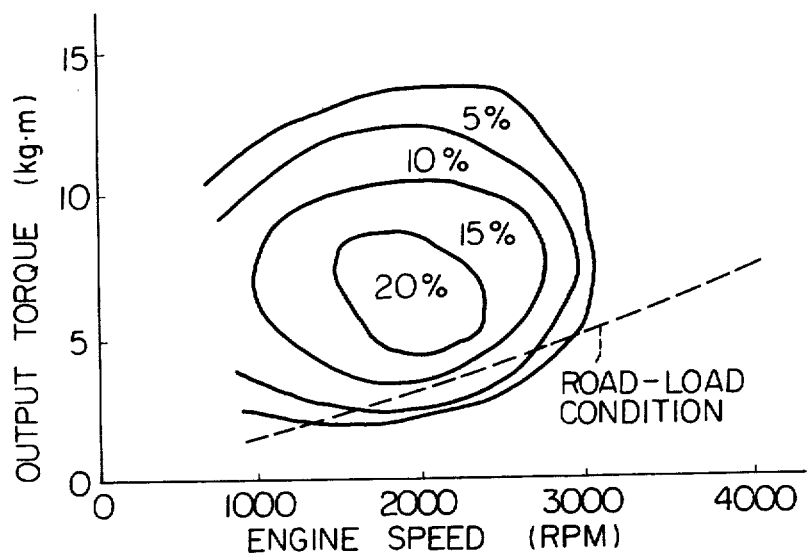
FIG. 2 is a chart showing an example of variations in an optimum scale of EGR with respect to the engine operating condition.

An optimum rate of EGR varies mainly depending on the type and displacement of the engine 10, operating condition of the engine 10 and a permissible level of NOx emission. For a typical 2-liter automotive engine by way of example, an optimum rate of EGR for maintaining the emission of NOx below a level of 0.25 g/km varies with the engine operating condition in a way as shown in FIG. 2. The curve drawn in broken line indicates an output torque required during constant speed cruising (so-called road-load condition). FIG. 2 shows that, while this engine is operated under road-load condition, the rate of EGR would be made 0% at engine speeds below 1300 RPM, 5% at engine speeds between 1300 and 1800 RPM, 10% at engine speeds between 1800 and 2800 RPM, 5% at engine speeds between 2800 and 2900 RPM and 0% at engine speeds above 2900 RPM.

Figure 3:
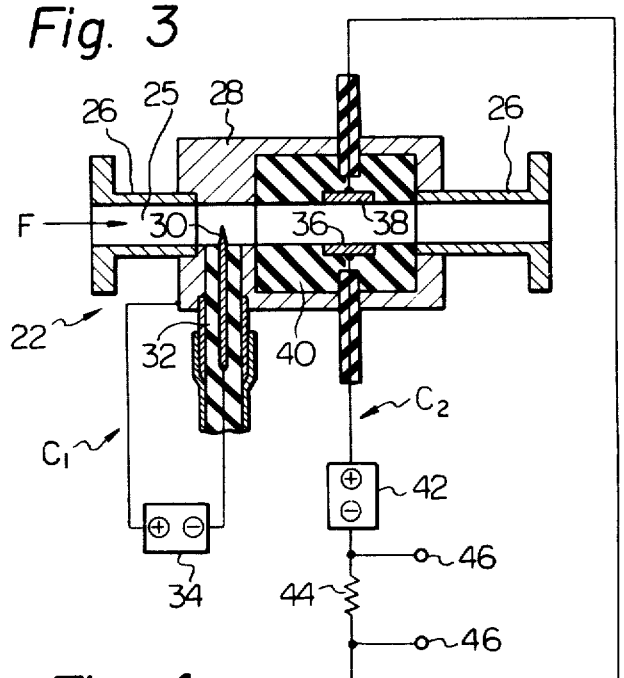

FIG. 3 shows an example of the electrostatic type flow rate sensor 22 in FIG. 1. A metal member 28 having a cross-sectionally cylindrical bore is assembed with a pipe 26 (which corresponds to the exhaust gas recirculation conduit 16 in FIG. 1) such that the bore of the member 28 serves as a portion of a fluid passage 25 given by the pipe 26. A needle-shaped electrode member 30 is inserted radially into the member 28 with the provision of an insulator 32 so as to protrude into the passage 25. A shield wire may be used as the combination of the electrode member 30 and the insulator 32. The electrode 30 is connected to one terminal of a DC high voltage (several kilovolts) power supply 34, and the metal member 28 is connected to the other terminal of this power supply 34 to serve as an electrode of a high voltage discharge circuit $C_1$. It is intended that a fluid such as an engine exhaust gas flows through the passage 25 always in the direction indicated by the arrow F. Downstream from the electrode 30, a pair of plate-shaped electrode members 36 and 38 are embedded in the member 28 with the provision of insulators 40 so as to face each other at a distance in a direction generally normal to the direction F of the fluid flow. These two electrodes 36 and 38 are connected to a DC high voltage (several kilovolts) power supply 42 of a constant voltage type, and a load resistor 44 is interposed between the power supply 42 and one (38) of these two electrodes 36, 38, so that a current flowing through this circuit $C_2$ can be detected by measuring a voltage between output terminals 46 located across the resistor 44.

The flow rate sensor 22 of FIG. 3 operates on the following principle.

A high voltage of, for example, about 5 kV is applied to the electrodes 28 and 30 while a fluid such as the recirculated exhaust gas flows through the passage 25. The magnitude of the voltage and the distance between the two electrodes 28 and 30 are made such that corona discharge occurs between the electrodes 28 and 30. The corona discharge causes partial ionization of the exhaust gas. Since the two electrodes 28 and 30 are different in shape, an electric field produced in the exhaust gas flow by the corona discharge is of a nonuniform distribution. Among ions formed by the corona discharge, therefore, one of positively charged ions or negatively charged ions are attracted to and collected by one of the two electrodes 28, 30 (depending on the polarity of the differently shaped two electrodes 28, 30) almost completely, while the other (negatively charged ions or postively charged ions) are carried downstream by the flow of the exhaust gas. As is apparent, the quantity of the ions present in a volume of exhaust gas is proportional to the rate of flow of the exhaust gas. Meanwhile, a constant DC high voltage of, for example, about 5 kV is applied to the electrodes 36 and 38 from the power supply 42, so that an electric field is produced in the gas passage 25 between these electrodes 36 and 38. When the ions carried by the gas flow come into this electric field, a current flows between the electrodes 36 and 38, i.e. through the circuit $C_2$, and the intensity of this current is proportional to the quantity of the ions contained in a volume of the exhaust gas. Accordingly, the rate of flow of the exhaust gas through the passage 25 can be detected by measuring the intensity of this current and hence a voltage across the load resistor 44 taken out at the output terminals 46 serves as the feedback signal $S_f$ in FIG. 1.

A flow rate sensor 22A shown in FIG. 4 too has a set of corona discharge electrodes 28 and 30 but differs from the sensor 22 of FIG. 3 in the following respects.

Instead of a pair of electrodes 36, 38 in FIG. 3, a single electrode member or probe 50 which takes the form of net is disposed in the fluid passage 25 at a distance downstream from the electrode 30. A high voltage power supply 52 of the corona discharge circuit $C_1$ in this sensor 22A is of a type capable of intermittently applying a high voltage for making corona discharge to the electrodes 28, 30. This sensor 22A includes a computer circuit 54 to which are connected the probe 50 and the power supply 52. This circuit 54 has the function of commanding intermittent generation of a high voltage to the power supply 52 (or, alternatively, recognizing the generation of the voltage), measuring a time interval between the application of a high voltage from the power supply 52 to the electrodes 28, 30 and the arrival of ions formed by the corona discharge at the probe 50 indicated by a voltage change at the probe 50, computing the velocity of the exhaust gas flow and as a consequence the flow rate of the gas from the measured time interval, and producing an electrical signal (as the feedback signal $S_f$) representing the computed flow rate.

Figure 4:
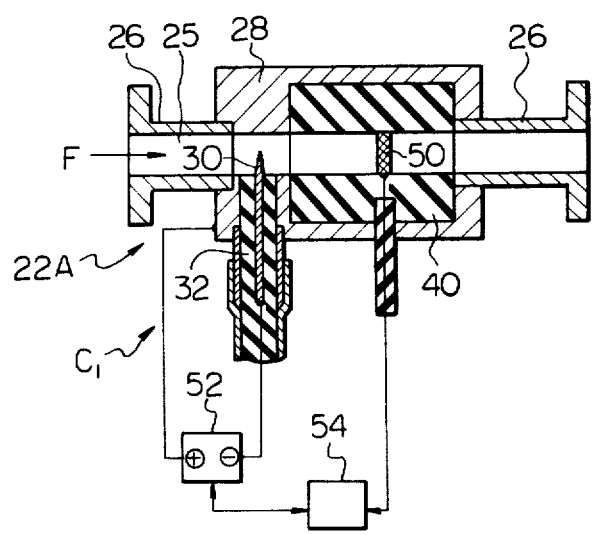

A flow rate sensor 22B shown in FIG. 5 has the same corona discharge circuit $C_1$ as the sensor 22 of FIG. 3 and the net-shaped ion detection electrode 50 used in the sensor 22A of FIG. 4. In this case the electrode 50 is simply grounded through a load resistor 56. This sensor 22B is based on the fact that the electrode 50 collects the ions carried by the exhaust gas flow with the result that a voltage which represents the amount of electric charge per unit time on the electrode 50 is developed across the resistor 56. Since the quantity of the collected ions is proportional to the flow rate of the exhaust gas, the voltage across the resistor 56 taken out at output terminals 58 indicates the flow rate.

A flow rate sensor 22C of FIG. 6 is different from the above described flow rate sensors in the provision of no electrode or probe for detection of ions carried by the exhaust gas flow. This sensor 22C too has the above described corona discharge electrodes 28 and 30 though they are illustrated as are associated with the pipe 26 in a modified manner by the use of a tubular insulator 62. In this case a high voltage power supply 64 of a constant current type is used for making corona discharge across the electrodes 28, 30, and a load resistor 66 is interposed between the power supply 64 and one of the electrodes 28, 30. When corona discharge is made across the electrodes 28, 30, a current $I_1$ flows between the two electrodes 28 and 30. This current $I_1$ decreases as the flow rate of the exhaust gas increases since a portion of the ions formed by the corona discharge is carried away by the exhaust gas flow in a quantity increasing proportionally to an increase in the gas flow rate. The magnitude of decrease in the current $I_1$ from this reason will be expressed as $I_2$, which may be considered as a current capable of being produced by the ions carried away. The power supply 64 supplies a constant current $I_0$, and there holds the relation $I_0 = I_1 + I_2$. It is possible therefore to find the intensity of the current $I_2$, which implies the gas flow rate, by detecting the intensity of the current $I_1$ which flows through the load resistor 66. Accordingly a voltage across the resistor 66 taken out at output terminals 68 represents the gas flow rate.

FIG. 7 shows an experimentally confirmed relationship between the current $I_1$ (hence the current $I_2$) and the flow rate of the exhaust gas when the fluid passage 25 was 4 cm in diameter, the voltage applied to the electrodes 28, 30 was 5 kV and the resistance of the resistor 66 was 1 mΩ. The relationship between the current $I_1$ and the gas flow rate can be varied by varying factors such as the length of the gap between the two electrodes 28 and 30, the voltage for making corona discharge and the resistance of the resistor 66.

It is important that the current $I_2$ returns to the power supply 64 surely, so that the pipe 26 should be grounded downstream of the electrodes 28, 30 or, alternatively, an ion collection electrode such as the net electrode 50 in FIG. 5 should be disposed in the passage 25 downstream of the electrodes 28, 30 and grounded. As an optional way of maintaining ($I_1 + I_2$) constant despite changes in the electrical properties of the fluid, a resistor may be interposed between the power supply 64 and the electrode 30 and the power supply 64 will be controlled so as to maintain the magnitude of a voltage drop across this resistor constant.

As will have been understood, the flow rate sensors of FIGS. 3-6 are principally of the same type which has the function of forming ions in the fluid subject to measurement and detects the flow rate of the fluid from the movement of the ions caused by the flow of the fluid. Flow rate sensors of this type, an electrostatic type, have manifold advantages: they indicate a detected information as an electrical signal; they have no mechanically moving element; they offer only a minimized resistance to a fluid flow; they can detect a momentary flow rate; they work with high precision and have high reliability; they can be made compact; and they need little maintenance work. Accordingly these electrostatic sensors are quite suitable for use in fluid passages related to automotive engines. The above described flow rate sensors are disclosed in Japanese patent applications 51(1976)-154330, 52(1977)-3003 and others all by Nissan Motor Company Ltd.

The electromagnetic flow control valve 20 in the system of FIG. 1 may have a construction, by way of example, as shown in FIG. 8. A closed-end cylinder 74 which is partly surrounded by a solenoid coil 76 has in its side wall a fluid inlet 78 and an outlet 80. A plunger 82 of a magnetic material is received in the cylinder 74 and biased towards one end of the cylinder 74 by a spring 84. This plunger 82 is locally reduced in cross section so as to provide a fluid passage connecting the inlet 78 to the outlet 80 and vary an effective cross-sectional area of this passage depending on the position of the plunger 82. When a current corresponding to the control signal $S_c$ in FIG. 1 flows through the solenoid coil 76, the plunger 82 takes a position determined by the force of the spring 84 and the intensity of the current. Accordingly the effective area of the fluid passage in the cylinder 74 and hence the flow rate of the fluid through this valve 20 can be varied continuously by varying the intensity of the current.

FIG. 9 shows a light modification of the control valve 20 of FIG. 8. In this case, the cylinder 74 has an outlet 80A at one end thereof and is shaped such that the inlet 78 communicates with the outlet 80A through a conical space. A plunger 82A received in the cylinder 74 has a conically shaped end portion so as to vary an effective cross-sectional area of the conical space. In other respects the control valve of FIG. 9 is identical with the valve 22 of FIG. 8.

In the EGR control system of FIG. 1, the rate of EGR is controlled electrically in accordance with the engine operating condition recognized from numerous parameters represented by the electrical signals $S_1, S_2, \ldots, S_n$, so tht the control can be accomplished with large degree of freedom. In addition, and as the most important feature, an actual flow rate of the exhaust gas through the recirculation passage 16, i.e. a realized rate of EGR, is detected electrically and employed as the feedback signal $S_f$. The rate of EGR, therefore, can be made optimum with high precision in every range of the engine operating condition with the result that the emission of NOx is maintained always below a permissible level while the fuel consumption, driveability and output characteristic of the engine 10 are not adversely influenced but can possibly be improved.

Referring to FIG. 10, the EGR control system of FIG. 1 may additionally comprise an electrostatic type flow rate sensor 86, which is identical with the hereinbefore described flow rate sensor 22 in fundamental construction and function, arranged to detect the flow rate of the exhaust gas in the exhaust passage 14 at a section upstream of the junction of this passage 14 and the recirculation passage 16. This flow rate sensor 86 supplies an electrical signal $S_e$ to the control circuit 24, which is constructed in this case so as to directly find a realized rate of EGR from the signal $S_f$, which represents the quantity of the recirculated exhaust gas, and the signal $S_e$, which represents the entire quantity of the exhaust gas, and vary the content of the control signal $S_c$ so as to bring the realized rate of EGR into agreement with an optimum rate of EGR found from the input signals $S_1, S_2, \ldots, S_n$. The EGR control system of FIG. 10 exhibits a further improved precision in the control than the system of FIG. 1.

A detailed description of a SAI control system according to the invention will be given hereinafter.

Figure 11:
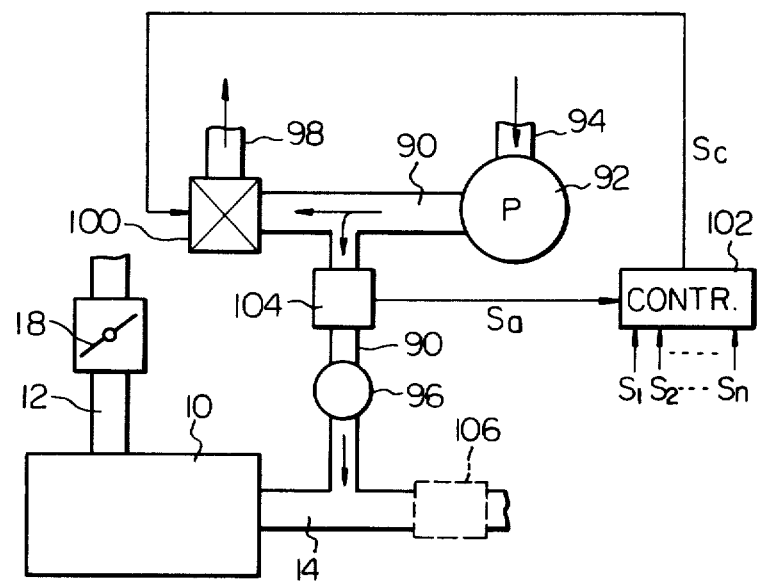
FIG. 11 shows diagrammatically a fundamental construction of a secondary air control system according to the invention.

In FIG. 11, the engine 10 is similar to that in FIG. 1. A secondary air feed conduit 90 connects an air pump 92 driven by the engine 10 to the exhaust passage 14, and air is admitted into the air pump 92 through an air inlet 94. The air conduit 90 is provided with a check valve 96 to prevent the exhaust gas from passing through this conduit 90 and branches at a section upstream of the check valve 96 to extend to an air discharge port 98 via an electrically operated flow control valve 100. A control circuit 102 to provide a control signal $S_c$ to the flow control valve 100 receives input signals $S_1, S_2, \ldots, S_n$ which respectively represent some parameters of the engine operating condition such as engine speed, intake vacuum, the temperature in an oxidation chamber (indicated at 106) such as a thermal reactor or a catalytic converter, etc. A flow rate sensor 104 of the electrostatic type is associated with the secondary air conduit 90 at a section between the check valve 96 and the branch point to the control valve 100 to provide a feedback signal $S_a$, which represents an actual rate of the flow of the secondary air directed to the exhaust passage 14, to the control circuit 102.

The control circuit 102 has the function of computing or finding an optimum quantity of secondary air to be admitted into the exhaust passage 14 under an engine operating condition indicated by the signals $S_1, S_2, \ldots, S_n$ and detecting any deviation of an actual quantity of secondary air introduced into the exhaust passage 14 and implied by the feedback signal $S_a$ from the found optimum quantity. The content of the control signal $S_c$ *so varies as to cancel the detected deviation through a change in the operation of the control valve* 100. When the feedback signal $S_a$ implies a larger quantity than the optimum quantity, the control signal $S_c$ causes enlargement of the degree of opening of the control valve 100 thereby to discharge an increased amount of air through the outlet 98, and vice versa.

Figure 12:
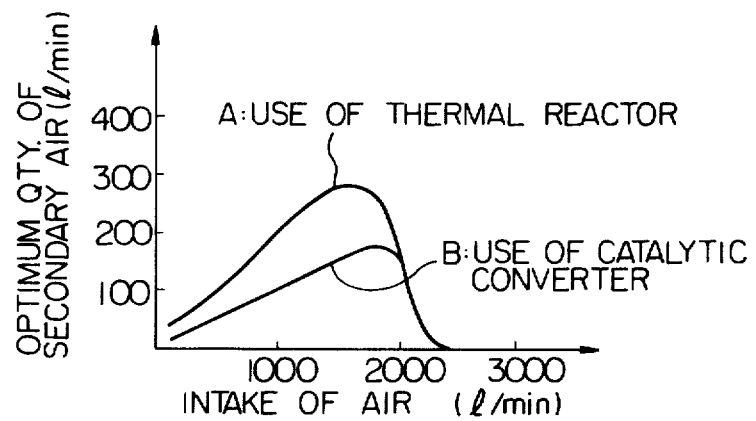
FIG. 12 is a graph showing variations in the quantity of secondary air required for accomplishing thorough oxidation of HC and CO with respect to the quantity of primary air admitted into the engine and the type of a reaction chamber for accomplishing the oxidation.

An optimum quantity of the secondary air varies depending on some factors such as the type and displacement of the engine 10 and the type of the means (106) for oxidizing HC and CO. In the case of the employment of a thermal reactor, the quantity of the secondary air may be controlled so as to keep the reactor temperature constant because this is favorable to fuel economy. Usually, however, a thermal reactor exhibits its full ability when secondary air is introduced in a variable quantity with respect to the quantity of air admitted into the engine (through the main induction passage 12) in a manner as shown in FIG. 12 by the curve A which represents an experimental result by way of example. When a catalytic converter is employed, an experiment on the same engine gave the curve B of FIG. 12. The quantity of air admitted into the engine can be detected by measuring the engine speed, intake manifold vacuum and a venturi section vacuum in the induction passage 12, or alternatively by the provision of an electrostatic type flow rate sensor in the induction passage 12 downstream of the main throttle valve 18.

The control circuit 102 may be constructed so as to find an optimum quantity of the secondary air based on either the quantity of air admitted into the engine 10 or the engine operating condition indicated by the engine speed, intake manifold vacuum, cooling water temperature, exhaust gas temperature, atmospheric pressure under which the engine 10 is operated, etc. Still alternatively, the optimum quantity may be determined primarily based on the quantity of air admitted into the engine 10 and then corrected according to the parameters such as engine speed, intake manifold vacuum, atmospheric pressure, etc. Also it is optional to control the quantity of the secondary air based on, or taking into account, the concentrations of HC and CO in the exhaust gas estimated from the concentration of a certain component of the exhaust gas which can be detected by means of a conventional exhaust gas sensor such as an oxygen sensor of the solid electrolyte concentration cell type.

The flow rate sensor 104 in the SAI control system of FIG. 11 can be selected from the flow rate sensors of FIGS. 3–6, and the flow control valve 100 may be either of the valves of FIGS. 8 and 9.

In the SAI control system of FIG. 11, the quantity of the secondary air is controlled electrically and an optimum quantity can be found based on numerous parameters represented by the electrical signals $S_1, S_2, \ldots, S_n$, so that the control can be accomplished with large degree of freedom. In addition, and as the most important feature, the quantity of actually introduced secondary air is detected electrically and employed as the feedback signal $S_a$. The quantity of secondary air, therefore, can be made optimum with high precision in every range of the engine operating condition with the result that the emission of HC and CO is maintained always below a permissible level for each of them. In conventional SAI control systems, which are commonly insufficient in the precision of the control, it is usual to set the target of the control at a quantity (of secondary air) somewhat larger than an optimum quantity accompanied with the employment of a fuel-rich mixture for operation of the engine thereby to prevent the occurrence of insufficient oxidation of HC and CO. As a natural disadvantage of this method, there occurs an increase in the fuel consumption. Such disadvantage is obviated in the SAI control system according to the invention since the quantity of the secondary air can be controlled always to an optimum value. Accordingly the purification of the exhaust gas by the use of secondary air can be achieved without any sacrifice of fuel economy.

What is claimed is:

1. A feedback control system for controlling the flow rate of a gas through a gas passage connected to an exhaust passage of an internal combustion engine, the system comprising:

an electrically operated flow rate control valve associated with said fluid passage;

at least one sensor means each for sensing a parameter of the operating condition of the engine and providing an electrical signal representing the sensed parameter;

an electrostatic flow rate detection means for detecting the rate of flow of said gas through said gas passage, by making corona discharge in a section of said gas passage thereby forming ions in said gas and detecting the movement of at least a portion of said ions carried downstream from said section of said gas passage by the flow of said gas, and providing an electrical signal representing the detected flow rate; and a control means for finding an optimum flow rate of said gas through said gas passage under an operating condition of the engine indicated by the signal or signals provided by said at least one sensor means, detecting any deviation of an actual flow rate represented by the signal provided by said flow rate detection means from said optimum flow rate and supplying to said flow control valve a control signal effective for cancellation of the detected deviation and establishment of said optimum flow rate.

2. A feedback control system for controlling the recirculation of a portion of the exhaust gas of an internal combustion engine through an exhaust gas recirculation passage interconnecting an exhaust passage and an induction passage of the engine, the control system comprising:

an electrically operated flow rate control valve associated with said recirculation passage;

at least one sensor means each for sensing a parameter of the operating condition of the engine and producing an electrical signal representing the sensed parameter;

an electrostatic flow rate detection means for detecting the rate of flow of the exhaust gas through said recirculation passage, by making corona discharge in a section of said recirculation passage thereby forming ions in the recirculated exhaust gas and detecting the movement of at least a portion of said ions carried downstream from said section of said recirculation passage by the flow of the exhaust gas, and providing an electrical feedback signal representing the detected flow rate; and a control means for finding an optimum flow rate of the exhaust gas through said recirculation passage under an operating condition of the engine indicated by the signal or signals provided by said at least one sensor means, detecting any deviation of an actual flow rate represented by said feedback signal from said optimum flow rate and supplying to said flow control valve a control signal effective for cancellation of the detected deviation and establishment of said optimum rate.

3. A control system according to claim 2, wherein said flow rate detection means comprise a set of corona discharge electrodes spaced and disposed in a first section of said recirculation passage, a first power supply to apply a high voltage to said corona discharge electrodes, a pair of measurement electrodes spaced and disposed in a second section of said recirculation passage downstream of said first section, a second power supply to apply a constant voltage to said measurement electrodes, and means for producing an electrical signal which represents a current flowing between said measurement electrodes upon arrival of at least a portion of said ions at said second section and serves as said feedback signal.

4. A control system according to claim 3, wherein said means for producing an electrical signal comprise a resistor connected in series with said measurement electrodes and said second power supply.

5. A control system according to claim 2, wherein said flow rate detection means comprise a set of corona discharge electrodes spaced and disposed in a first section of said recirculation passage, a power supply to intermittently apply a high voltage to said corona discharge electrodes, an ion detection electrode disposed in a second section of said recirculation passage downstream of said first section, and means for finding a time interval between the occurrence of corona discharge across said corona discharge electrodes and the arrival of at least a portion of said ions at said ion detection electrodes and producing said feedback signal based on said time interval.

6. A control system according to claim 2, wherein said flow rate detection means comprise a set of corona discharge electrodes spaced and disposed in a first section of said recirculation passage, a power supply to apply a high voltage to said corona discharge electrodes, an ion detection electrode disposed in a second section of said recirculation passage downstream of said first section, and means for detecting the amount of electric charge per unit time on said ion detection electrode and producing said feedback signal based on said amount of electric charge.

7. A control system according to claim 6, wherein the electric charge detection means comprise a resistor through which said ion detection electrode is grounded.

8. A control system according to claim 2, wherein said flow rate detection means comprise a set of corona discharge electrodes spaced and disposed in said section of said recirculation passage, a power supply to apply a high voltage to said corona discharge electrodes, and means for measuring a current flowing between said corona discharge electrodes when corona discharge is made and providing said feedback signal based on the measured current.

9. A control system according to claim 8, wherein the current measurement means comprise a resistor connected in series with said corona discharge electrodes and said power supply.

10. A control system according to claim 9, wherein said power supply is of a constant current type.

11. A control system according to claim 2, wherein said flow control valve is of a type capable of continuously varying the degree of opening thereof.

12. A feedback control system for controlling the recirculation of a portion of the exhaust gas of an internal combustion engine through an exhaust gas recirculation passage interconnecting an exhaust passage and induction passage of the engine, the control system comprising:

an electrically operated flow control valve associated with said recirculation passage;

at least one sensor means each for sensing a parameter of the operating condition of the engine and producing an electrical signal representing the sensed parameter;

electrostatic first flow rate detection means for detecting the rate of flow of the exhaust gas through said recirculation passage by making corona discharge in a section of said recirculation passage thereby forming ions in the exhaust gas and detecting the movement of at least a portion of said ions carried downstream from said section of said recirculation passage by the flow of the exhaust gas and providing an electrical signal representing the detected flow rate;

electrostatic second flow rate detection means for detecting the rate of flow of the exhaust gas through said exhaust passage upstream of a section where said recirculation passage branches from said exhaust passage and providing an electrical signal representing the detected flow rate, said second flow rate detection means operating on the same principle as said first flow rate detection means; and a control means for finding an optimum proportion of the recirculated exhaust gas to the entire exhaust gas discharged from the engine under an operating condition of the engine indicated by the signal or signals produced by said at least one sensor means, finding an actual proportion of the recirculated exhaust gas to the entire exhaust gas discharged from the engine by comparison of the electrical signal provided by said second flow rate detection means with the electrical signal provided by said first flow rate detection means, detecting any deviation of said actual proportion from said optimum proportion and supplying to said flow control valve a control signal effective for cancellation of the detected deviation and establishment of said optimum proportion.

13. A feedback control system for controlling the introduction of secondary air into an exhaust passage of an internal combustion engine through an air feed passage which opens into the atmosphere, the control system comprising:

an electrically operated flow control valve associated with said air feed passage;

at least one sensor means each for sensing a parameter of the operating condition of the engine and producing an electrical signal representing the sensed parameter;

an electrostatic flow rate detection means for detecting the rate of flow of secondary air through said air feed passage, by making corona discharge in a section of said air passage thereby forming ions in secondary air and detecting the movement of at least a portion of said ions carried downstream from said section of said air feed passage by the flow of the secondary air, and providing an electrical feedback signal representing the detected flow rate; and a control means for finding an optimum quantity of secondary air to be introduced into said exhaust passage through said air feed passage under an operating condition of the engine indicated by the signal or signals produced by said at least one sensor means, detecting any deviation of an actual quantity of secondary air introduced into said exhaust passage and represented by said feedback signal from said optimum quantity and supplying to said flow control valve a control signal effective for cancellation of the detected deviation and establishment of said optimum quantity.

14. A control system according to claim 13, wherein said flow rate detection means comprise a set of corona discharge electrodes spaced and disposed in a first section of said air feed passage, a first power supply to apply a high voltage to said corona discharge electrodes, a pair of measurement electrodes spaced and disposed in a second section of said air feed passage downstream of said first section, a second power supply to apply a constant voltage to said measurement electrodes, and means for producing an electrical signal which represents a current flowing between said measurement electrodes upon arrival of at least a portion of said ions at said second section and serves as said feedback signal.

15. A control system according to claim 14, wherein said means for producing an electrical signal comprise a resistor connected in series with said measurement electrodes and said second power supply.

16. A control system according to claim 13, wherein said flow rate detection means comprise a set of corona discharge electrodes spaced and disposed in a first section of said air feed passage, a power supply to intermittently apply a high voltage to said corona discharge electrodes, an ion detection electrode disposed in a second section of said air feed passage downstream of said first section, and means for finding a time interval between the occurrence of corona discharge across said corona discharge electrodes and the arrival of at least a portion of said ions at said ion detection electrode and producing said feedback signal based on said time interval.

17. A control system according to claim 13, wherein said flow rate detection means comprise a set of corona discharge electrodes spaced and disposed in a first section of said air feed passage, a power supply to apply a high voltage to said corona discharge electrodes, an ion detection electrode disposed in a second section of said air feed passage downstream of said first section, and means for detecting the amount of electric charge per unit time on said ion detection electrode and producing said feedback signal based on said amount of electric charge.

18. A control system according to claim 17, wherein the electric charge detection means comprise a resistor through which said ion detection electrode is grounded.

19. A control system according to claim 13, wherein said flow rate detection means comprise a set of corona discharge electrodes spaced and disposed in said section of said air feed passage; a power supply to apply a high voltage to said corona discharge electrodes, and means for measuring a current flowing between said corona discharge electrodes when corona discharge is made and providing said feedback signal based on the measured current.

20. A control system according to claim 19, wherein the current measurement means comprise a resistor connected in series with said power supply and said corona discharge electrodes.

21. A control system according to claim 20, wherein said power supply is of a constant current type.

22. A control system according to claim 13, wherein said flow control valve is of a type capable of continuously varying the degree of opening thereof.

23. A control system according to claim 22, wherein said flow control valve is arranged so as to discharge a controlled amount of air from said air feed passage into the atmosphere in response to said control signal thereby to control the quantity of secondary air introduced into said exhaust passage.

24. A control system according to claim 23, further comprising an air pump through which air is admitted from the atmosphere into said air feed passage.

* * * * *